(12) United States Patent
Ferretti et al.

(10) Patent No.: US 11,105,507 B2
(45) Date of Patent: Aug. 31, 2021

(54) PROCEDURE FOR OBTAINING RAW MATERIAL RESULTING FROM WASTE MATERIAL

(71) Applicant: FERRAM RECYCLING S.R.L., Terni (IT)

(72) Inventors: Flavio Ferretti, Terni (IT); Gaetano Vitarelli, Turin (IT); Giancarlo Binacci, Terni (IT); Luigi Nigrelli, Terni (IT); Giorgio Baldinelli, Perugia (IT)

(73) Assignee: Ferram Recycling S.r.l., Terni (IT)

( * ) Notice: Subject to any disclaimer, the term of this patent is extended or adjusted under 35 U.S.C. 154(b) by 0 days.

(21) Appl. No.: 15/999,752

(22) PCT Filed: Feb. 17, 2017

(86) PCT No.: PCT/IB2017/050906
§ 371 (c)(1),
(2) Date: Aug. 20, 2018

(87) PCT Pub. No.: WO2017/141203
PCT Pub. Date: Aug. 24, 2017

(65) Prior Publication Data
US 2019/0375990 A1    Dec. 12, 2019

(30) Foreign Application Priority Data

Feb. 19, 2016  (IT) ............ UB2016A000894

(51) Int. Cl.
*F23G 5/10*     (2006.01)
*B09B 3/00*     (2006.01)
(Continued)

(52) U.S. Cl.
CPC .............. *F23G 5/10* (2013.01); *B09B 3/0083* (2013.01); *C10B 53/07* (2013.01);
(Continued)

(58) Field of Classification Search
CPC . F23G 5/10; F23G 2204/204; F23G 2209/281
See application file for complete search history.

(56) References Cited

U.S. PATENT DOCUMENTS 4,469,573 A * 9/1984 Munih ............... B29B 17/021
                                                   204/155
5,084,141 A * 1/1992 Holland ............ B01J 19/126
                                                    201/19
(Continued)

FOREIGN PATENT DOCUMENTS

EP    2103874 A2    9/2009
EP    2119545 A2    11/2009
(Continued)

OTHER PUBLICATIONS

International Search Report and Written Opinion dated May 2, 2017 from International Patent Application No. PCT/IB2017/050906 filed Feb. 17, 2017.

*Primary Examiner* — David J Laux
(74) *Attorney, Agent, or Firm* — David B. Tingey; Bryant J. Keller; Kirton McConkie

(57) ABSTRACT

The procedure (1) for obtaining raw materials resulting from waste material comprises: the supply (A) of harmonic steel resulting from waste material and prepared in a skein to be treated (3); a heat treatment (B) of the skein to be treated (3) for obtaining a treated skein (3a);—a post-treatment (E) of the treated skein (3a) for obtaining steel reusable as raw material; where the heat treatment (B) comprises an inductive exposure step (B1) of the skein to be treated (3) to at least an alternate magnetic field for the induction in the skein to be treated (3) of alternate eddy currents adapted to raise the temperature of same.

8 Claims, 1 Drawing Sheet

(51) Int. Cl.
  *C10B 53/07*   (2006.01)
  *B29C 35/08*   (2006.01)
(52) U.S. Cl.
  CPC  *B29C 2035/0816* (2013.01); *F23G 2204/204* (2013.01); *F23G 2209/281* (2013.01)

(56) References Cited

U.S. PATENT DOCUMENTS

| | | | | |
|---|---|---|---|---|
| 5,085,738 A | * | 2/1992 | Harris | C10B 7/06 201/11 |
| 5,330,623 A | * | 7/1994 | Holland | B01J 19/126 201/19 |
| 5,783,046 A | * | 7/1998 | Flanigan | C10B 25/16 201/13 |
| 6,018,471 A | * | 1/2000 | Titus | A62D 3/19 363/126 |
| 6,152,306 A | * | 11/2000 | Miller | B03B 9/06 110/220 |
| 6,376,738 B1 | * | 4/2002 | Kashiwagi | B01D 53/508 588/316 |
| 6,693,265 B1 | * | 2/2004 | Bell | B01J 19/126 219/680 |
| 8,603,404 B2 | * | 12/2013 | Pinatti | C09C 1/482 422/198 |
| 8,668,810 B1 | * | 3/2014 | Vardanyan | C10B 53/07 201/19 |
| 9,663,662 B1 | * | 5/2017 | Khusidman | C01B 3/02 |
| 9,951,281 B2 | * | 4/2018 | Farneman | C10G 1/10 |
| 10,011,774 B2 | * | 7/2018 | Bianchina | C10B 1/04 |
| 2008/0063578 A1 | * | 3/2008 | Molohon | B01J 19/126 422/186.18 |
| 2010/0087554 A1 | * | 4/2010 | Berezin | B29B 17/021 521/40 |

FOREIGN PATENT DOCUMENTS

| | | |
|---|---|---|
| EP | 2698238 A1 | 2/2014 |
| EP | 2878388 A1 | 6/2015 |
| JP | H09 286990 A | 11/1997 |

\* cited by examiner

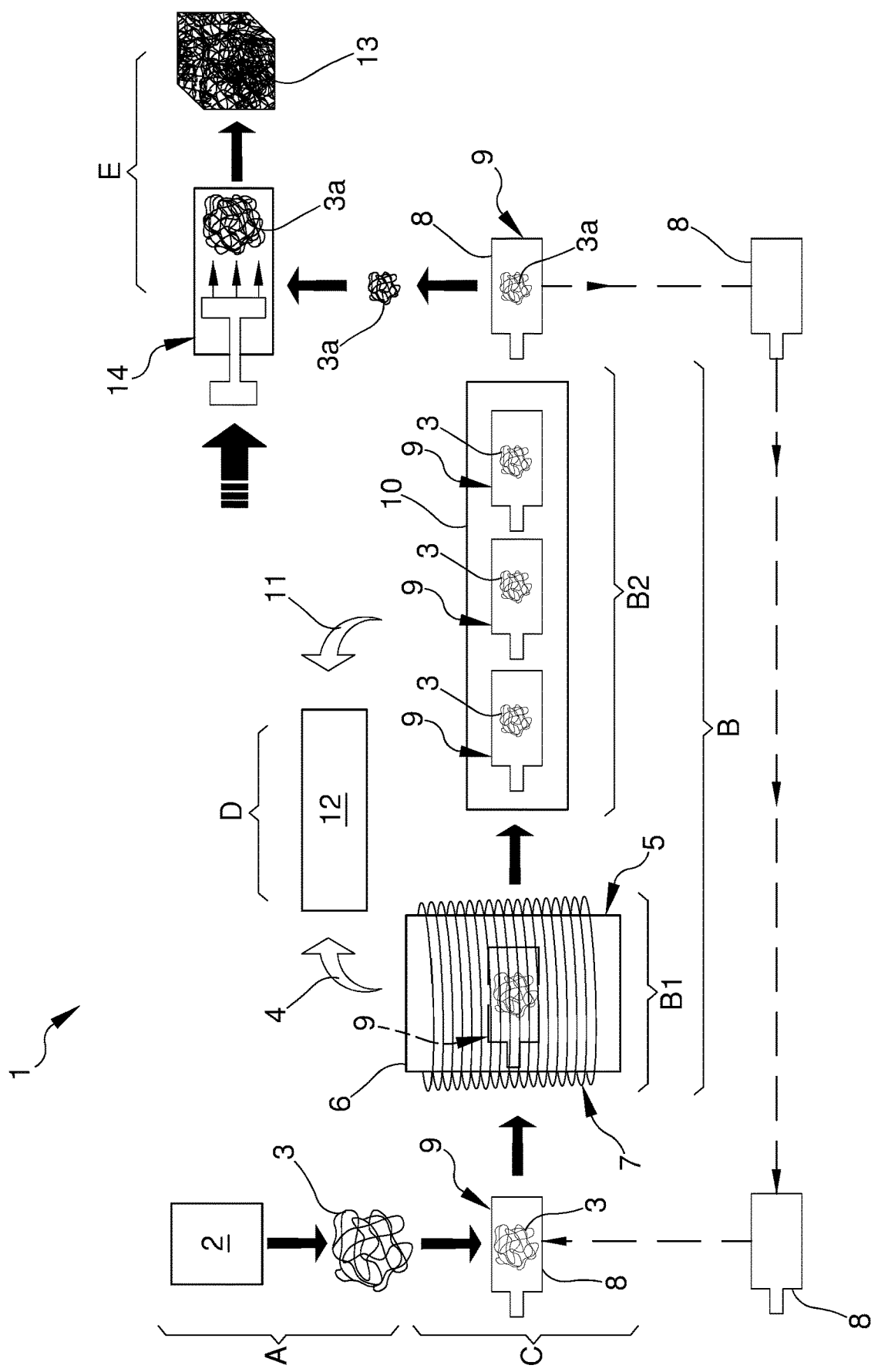

PROCEDURE FOR OBTAINING RAW MATERIAL RESULTING FROM WASTE MATERIAL

TECHNICAL FIELD

The present invention relates to a procedure for obtaining raw materials resulting from waste material, particularly from end-of-life tyres (ELT) and similar products.

BACKGROUND ART

The disposal of end-of-life tyres (ELT) and similar products, such as oil-hydraulic piping, is a problem particularly felt in consideration of the huge amount of waste material produced every year.

The nature of these materials allowed the development of a supply chain dedicated to the at least partial recovery of such products which would otherwise be disposed of at the landfill site.

In this regard, it is known to mechanically treat the tyres in order to separate the various components (rubber, canvas, steel wires) and direct them to the subsequent treatments aimed at obtaining reusable material.

For example, the rubber which has been separated is sent to shredding, granulation and refining processes in order to obtain grain-size material of selected dimensions, suitable for different uses such as the preparation of mixtures for road infrastructure, the filling of sound-insulating panels, the blockage of the synthetic grass fields, and other methods of use.

Similarly to what has been described for rubber, the need is known to partially or totally reuse the steel present in the tyres.

The steel is used in tyres both to obtain a reinforcement structure adapted to increase tread resistance and to make support clamps positioned at the tyre bead.

In any case, steel is present in the form of filaments and is characterized by high stiffness and shape memory (harmonic steel wire) to cope with the stresses received without jeopardizing the functionality of the tyre.

Similar considerations can be made for the oil-hydraulic piping.

Even in this case, the steel used is in the form of filaments with high stiffness and shape memory, and performs the function of reinforcing the pipe to avoid excessive crushing deformations or the like.

Extraction methods exist for extracting harmonic steel from ELTs and from the pipes which are based on "bead breaking" (for tyres) or on "tear off" extraction techniques aimed at separating steel from rubber.

The steel obtained from these waste materials, by law, is considered as waste under code CER 16.01.21 for steel coming from pipes, and code CER 19.12.02 for steel coming from ELTs.

The obtained harmonic steel (waste-steel) in fact, is "polluted" by a not negligible amount of stuck textile fibers and residual rubber, and comes in the form of skeins of wires which are hardly foldable and workable.

For these reasons, the extracted steel cannot be reused as such, but must be treated in order to leave the waste cycle and be reused.

It is known to have skeins of harmonic steel resulting from ELTs subjected to treatment processes for the transformation of the waste-steel into raw materials to be reused.

Such processes provide for heat treatment, in particular heat treatment in the air, of the waste-steel in heated environments, e.g. rotary drum furnaces or the like, with the purpose of both oxidizing the rubber and textile fibers which remained stuck onto the steel, and softening the steel by depriving it of its high stiffness and shape memory characteristics.

The skeins of steel wires inserted in this environment are heated by convection (the hot air flow inside the furnace laps the skeins), by irradiation (radiative exchange of the skeins with the furnace walls) and by conduction (heat transfer in the contact between the skeins and the furnace inner hot parts), causing an at least partial oxidation of the material which is inside the furnace.

The oxidized and heated material then cools down and is sent to subsequent mechanical treatments adapted to finalize the transformation of the waste-steel into reusable raw material such as, e.g., a pressing operation for the formation of blocks to be used as a charge in the melting furnaces.

The aforementioned known processes are very difficult to apply, with several drawbacks particularly relating to the heat treatment of steel wire skeins.

A first drawback is linked to the fact that the steel skeins, because of the stiffness and shape memory characteristics of harmonic steel, can be treated in large quantities only in very big furnaces.

This involves high management costs linked to the large amount of energy required to heat the entire volume enclosed by the furnace.

Another drawback is linked to the fact that heat treatment in the air allows to heat the environment enclosed by the furnace, but does not allow for a homogeneous heating of the material inserted therein.

The skeins inserted in the furnace, e.g., may be exposed to temperature increases which may be different from point to point, with a consequent lack of homogeneity in the state of oxidation of the treated material and, therefore, of the physical and mechanical characteristics of the product obtainable at the end of the process.

A further drawback is linked to the fact that traditional furnaces, such as a rotary drum furnace, do not allow for a flexible control of thermal power, being energetically and economically expensive to operate the furnace at its full capacity, as well as they do not allow for frequent switching on and off cycles, this being harmful for the mechanical components involved which will also be subjected to wear.

This affects the ability of controlling and making the temperatures flexible to be used in the process.

DESCRIPTION OF THE INVENTION

The main aim of the present invention is to devise a procedure for obtaining raw materials resulting from waste material which allows for sustainable production both from the economic and environmental point of view.

One object of the present invention is to devise a procedure for obtaining raw materials resulting from waste material which allows improving the quality and purity of the raw material obtained.

Another object of the present invention is to devise a procedure for obtaining raw materials resulting from waste material which allows greater control and greater flexibility of the thermal powers involved.

Another object of the present invention is to devise a procedure for obtaining raw materials resulting from waste material which allows overcoming the mentioned drawbacks of the prior art within the ambit of a simple, rational, easy and effective to use as well as affordable solution.

The above mentioned objects are achieved by the present procedure for obtaining raw materials resulting from waste material having the characteristics of claim 1.

BRIEF DESCRIPTION OF THE DRAWINGS

Other characteristics and advantages of the present invention will become more evident from the description of a preferred, but not exclusive, embodiment of a procedure for obtaining raw materials resulting from waste material, illustrated by way of an indicative but non-limiting example, in the accompanying table of drawings wherein FIG. 1 is a schematic illustration of the procedure according to the invention.

EMBODIMENTS OF THE INVENTION

With particular reference to such figures, reference numeral 1 globally indicates a procedure for obtaining raw materials resulting from waste material, particularly resulting from end-of-life tyres (ELT) or from oil-hydraulic piping.

The procedure 1 comprises the supply A of harmonic steel resulting from waste material.

The waste material, preferably ELT and oil-hydraulic pipes, is obtained from a series of transformation processes, shown by way of example with reference numeral 2, located downstream the procedure 1.

Such transformation processes 2 comprise steps of shredding, "bead breaking" and the like adapted to separate harmonic steel wires from the rest of the waste material.

The wires obtained, which are not usable as such because of their stiffness and shape memory properties which are typical of harmonic steel and because of the high amount of residual textile fibers and rubber, are arranged to form a skein to be treated 3.

Alternative solutions cannot be ruled out providing for the use of different transformation processes aimed at obtaining harmonic steel from waste materials, as long as it is possible to arrange the obtained harmonic steel in skeins to be treated.

The procedure 1 furthermore comprises a heat treatment B of the skein to be treated 3 for obtaining a treated skein 3a.

According to the invention, the heat treatment B comprises an inductive exposure step B1 of the skein to be treated 3 to at least one alternate magnetic field for the induction of alternate eddy currents in the same skein.

The eddy currents, in particular, are adapted to raise the temperature of the skein to be treated 3, by heating the metallic material involved.

The metallic mass involved, in fact, when subjected to alternate magnetic fields, internally develops flows of electrical current which is induced by the variation of the magnetic fields, with consequent heat production by Joule effect.

The heat production is quantifiable for a known amount of skein to be treated 3 inasmuch as it is proportional to the intensity of the electrical current flowing in the skein to be treated 3, with the current intensity which is in turn proportional to the intensity of the alternate magnetic fields.

This way, the skein to be treated 3 is heated by generating oxidation processes concerning both harmonic steel and rubber, textile fibers and other residual "polluting" material.

This way, steel loses its stiffness and shape memory characteristics which are typical of harmonic steel.

Rubber, textile fibers and any other material, on the other hand, are burnt and generate combustion fumes 4.

Preferably, the exposure step B1 is made in an electromagnetic induction furnace 5 having induction heating means, for simplicity not shown in the FIGURE, of the skein to be treated 3.

Usefully, the induction furnace 5, schematically shown in FIG. 1, is provided with a charging chamber 6, adapted to receive the skein to be treated 3, surrounded by several coils 7 intended to be crossed by electrical currents for the induction of alternate magnetic fields inside the charging chamber itself.

A furnace of this type allows working in a pulsating "operating" mode, i.e. it allows varying the power at will without reducing the life and jeopardizing the smooth operation of the parties involved.

Furthermore, the induction furnace 5 comprises means for the escape of the combustion fumes 4.

This way the combustion fumes 4 can be taken away from the charging chamber 6.

Advantageously, the procedure 1 comprises a charging step C of the skein to be treated 3 on a support element 8 made of a material insensitive to the magnetic fields so as to form a charge unit 9 to be sent to the induction furnace 5.

The support element 8, illustrated by way of example, is the type of a ceramic tray and therefore it is not subjected to the effect of the alternate magnetic fields.

This solution allows inserting and taking the skein to be treated 3 in/out of the induction furnace 5.

One or more support elements 8 can be used.

The use of different support elements 8 cannot be ruled out, provided they do not suffer from the inductive effect of the magnetic fields.

Advantageously, the heat treatment B comprises a heating step of the skein to be treated 3 adapted to raise the temperature of same to a work value between 800° C. and 950° C.

By working within this temperature range, in fact, steel loses its harmonic characteristics.

Usefully, the duration of the preheating step is comprised in a range between 8 and 12 minutes, preferably equal to 10 minutes.

The heating step can take place directly in the induction furnace 5, but preheating of the skein to be treated 3 cannot be ruled out.

In this case, preheating would occur externally to the induction furnace 5, during the charging step C or immediately after, thus recovering part of the heat produced by the combustion fumes or other hot parts.

Subsequently, the heat treatment B comprises a step of maintaining the temperature of the skein to be treated 3 at the work value.

Even the maintenance step lasts between 8 and 12 minutes, preferably equal to 10 minutes.

The maintenance step takes entirely place inside the induction furnace 5.

In the case where the heating step takes entirely place inside the induction furnace 5, the exposure step B1 coincides with the sum of the preheating and maintenance steps.

In the case where the heating step takes place partly outside the induction furnace 5, the exposure step B1 coincides with the sum of the maintenance step and the rate of preheating step in the induction furnace 5.

The heat treatment B, finally, ends up with a cooling step B2 of the skein to be treated 3 previously heated.

In particular, the cooling step B2 lasts five times longer than the maintenance step.

This way, the cooling step B2 takes place in a gradual and prolonged manner, in order to avoid the formation of thermal hardening processes that would cancel the ductility given to the metallic mass with the cancellation of the harmonic characteristic.

Advantageously, the cooling step is made in a cooling chamber 10, schematically illustrated in the FIGURE, provided with means for the gradual cooling of the skein to be treated 3.

Usefully, the cooling chamber 10 allows cooling the skein to be treated 3 in still air, thus avoiding sudden drops in temperature which are harmful for the final characteristics of reusable steel.

The cooling chamber 10 also comprises means for the escape of residual combustion fumes 11.

The skein to be treated 3 previously heated, in fact, continues the oxidation process even at the beginning of the cooling process, thus causing the production of fumes.

For this reason, the procedure 1 comprises a fume treatment step D adapted to prepare the combustion fumes 4 and the residual combustion fumes 11 for their emission into the atmosphere.

In particular, during the fume treatment step D, gases resulting from the oxidation processes are treated so as to reduce the polluting substances in order to bring the values related to the concentration of the polluting substances or related to other parameters (for example pH and temperature) within the limit values established by the laws in force.

Advantageously, the fume treatment step D takes place in a regenerative thermal-oxidizer system, schematically shown with reference numeral 12.

The use of the induction furnace 5, in fact, allows having a relatively low temperature of the output fumes, such as to allow using an oxidizer system of this type.

In the present embodiment, the regenerative thermal-oxidizer system 12, not illustrated for simplicity sake, is of the regenerative type on ceramic masses.

In particular, a system of this type allows recovering thermal energy from the fumes purified at output and then stores it in chambers made with ceramic masses.

The energy accumulated therein is intended to be returned to heat the fumes to be treated thus allowing, together with a possible burner, the oxidation of the polluting substances (volatile organic substances) such as, for example, chlorinated solvents and non-chlorinated solvents.

Alternative solutions cannot be ruled out in which the fume treatment step D is made of systems of different type, e.g. systems that implement technologies based on activated carbon powders, or filters, or a combination thereof.

The procedure 1 finally comprises a post-treatment E of the treated skein 3a for obtaining reusable steel 13 which is reusable as a raw material.

In the present embodiment, the post-treatment E comprises a sieving step, for simplicity not shown in the figures, adapted to separate the residual material from the treated skein 3a.

Following the combustion processes, in fact, on the exiting treated skein 3a some residual material may remain such as ashes or other easily removable solid products.

Subsequently, the post-treatment E comprises a compaction step of the treated skein 3a made with hydropneumatic compaction means 14, schematically illustrated in FIG. 1.

The treated skein 3a, in fact, following the heat treatment B, no longer has the high stiffness and shape memory characteristics, and can be processed in shapes and sizes suitable for its use.

The compaction step, for example, allows compacting the treated skein 3a in steel blocks reusable as raw material in smelting furnaces of steel mills.

Different processing operations cannot however be ruled out aimed at obtaining reusable steel with different shapes and sizes, including, e.g., additional steps to those of sieving and compaction.

It has in practice been found that the described invention achieves the intended objects and in particular the fact is underlined that the procedure for obtaining raw materials resulting from waste material allows a production which is sustainable both from the economic and environmental point of view.

The heat treatment by electromagnetic induction, in fact, allows directly heating the metallic skein to be treated, without the need to maintain a constant temperature throughout the volume enclosed in the furnace.

This involves, compared to the use of "traditional" furnaces, smaller volumes and lower operating costs, with consequent economic savings.

In addition, the process allows for greater control and greater flexibility of the thermal powers involved.

The induction furnace, in fact, allows for a "pulsating operation" that allows saving on the amount of energy required, by modulating thermal powers and switching the furnace on and off when required and, unlike conventional furnaces, without worrying about any problems related to heat expansion (cracks in the refractory material, wear, etc.).

Another advantage relates to the possibility of causing the combustion fumes to escape at temperatures which enable the use of regenerative treatment systems or the like, which are considered to date among the "Best Available Technologies" (BAT) usable for fume removal, which are less expensive and less polluting than traditional technologies.

Finally, the devised procedure allows improving the quality and purity of the raw material obtained.

The homogeneous heating of the skein permitted by the induction furnace and the gradual cooling that occurs in the cooling chamber, in fact, allow both a correct transformation of the steel parameters, thus avoiding thermal quenching phenomena which are detrimental for its ductility, and a more effective combustion of the residues present in the waste-steel.

The invention claimed is:

1. A procedure for obtaining raw materials resulting from waste material, the procedure comprising:
    supplying a harmonic steel resulting from a waste material and prepared in a skein to be treated;
    providing a heat treatment of said skein to be treated to obtain a treated skein, wherein said heat treatment comprises an inductive exposure step of said skein to be treated to at least an alternate magnetic field for an induction in said skein to be treated of alternate eddy currents adapted to raise a temperature of said skein to be treated, such that the temperature of said skein to be treated is higher than a temperature of its surrounding environment, and wherein said heat treatment is adapted to raise the temperature of said skein to be treated to a work value between 800° C. and 950° C.;
    providing a post-treatment of said treated skein to obtain steel that is reusable as raw material;
    providing a maintenance step of the temperature of said skein to be treated to said work value; and
    providing a cooling step of said skein to be treated previously heated having a duration five times longer than a duration of said maintenance step in order to avoid the formation of thermal hardening processes.

2. The procedure according to claim 1, wherein said inductive exposure step is made in an electromagnetic induction furnace having induction heating means of said skein to be treated and comprising means for and escape of combustion fumes.

3. The procedure according to claim 2, further comprising a charging step of said skein to be treated on a support element made of a material insensitive to magnetic fields to form charge units to be sent to said induction furnace.

4. The procedure according to claim 1, wherein said cooling step is made in a cooling chamber that is configured to provide a gradual cooling of the skein to be treated and that is configured to allow residual combustion fumes to escape from the cooling chamber.

5. The procedure according claim 4, further comprising a fumes treatment step adapted to arrange said residual combustion fumes for emission to atmosphere.

6. The procedure according to claim 5, wherein said fumes treatment step is made in a regenerative thermal-oxidizer system.

7. The procedure according to claim 1, wherein said post-treatment comprises a sieving step adapted to separate residual material from said treated skein.

8. The procedure according to claim 1, wherein said post-treatment comprises a compaction step of said treated skein with a hydropneumatic compactor.

* * * * *